United States Patent [19]

Schlapp et al.

[11] Patent Number: 4,548,471
[45] Date of Patent: Oct. 22, 1985

[54] ADJUSTING DEVICE FOR LENSES

[75] Inventors: Werner Schlapp, Asslar; Herbert Mulch, Lahnau, both of Fed. Rep. of Germany

[73] Assignee: Ernst Leitz Wetzlar GmbH, Wetzlar, Fed. Rep. of Germany

[21] Appl. No.: 541,534

[22] Filed: Oct. 13, 1983

[30] Foreign Application Priority Data

Oct. 16, 1982 [DE] Fed. Rep. of Germany ... 8220039[U]

[51] Int. Cl.[4] .............................................. G02B 7/04
[52] U.S. Cl. ................................... 350/255; 350/429
[58] Field of Search ............................... 350/429, 255

[56] References Cited

U.S. PATENT DOCUMENTS 4,272,160 6/1981 Uesugi ............................... 350/429

*Primary Examiner*—John K. Corbin
*Assistant Examiner*—Loha Ben
*Attorney, Agent, or Firm*—Schwartz, Jeffery, Schwaab, Mack, Blumenthal & Evans

[57] ABSTRACT

Disclosed is an adjusting device for a lens system having at least two optical elements displaceable parallel to the optical axis, the paths of displacement of which are subject to different courses of movement. To produce linear displacement parallel to the optical axis, a tube is arranged in the adjusting ring, which is rotatable and displaceable parallel to the optical axis. This tube serves as the mount for an optical element and has in the wall of one of its ends a guide groove. A hollow cylinder, serving as the mount for the other optical element and being displaceably mounted in the tube, has a guide element mounted on its external wall which engages the guide groove. Means are provided to drivingly connect the adjusting ring and the hollow cylinder.

6 Claims, 3 Drawing Figures

ADJUSTING DEVICE FOR LENSES

BACKGROUND OF THE INVENTION

The present invention relates to an adjusting device for lens systems having at least two optical elements which are adjustable parallel to the optical axis, the paths of displacement of which are subject to two interdependent, but different courses of movement. Adjusting movements of this type serve for the focusing of photographic lenses, the correction of aberrations and/or the variation or constant maintenance of focal lengths in the case of objectives with variable focal lengths.

For this purpose, it is known for example from DE-OS No. 28 25 814 and DE-OS No. 30 45 414, to actuate the mechanical control of the variable optical elements by means of a pin and slot connection, wherein the pin fastened to the mounting of the optical elements engages helical or longitudinal guide grooves. The course of movement of the optical members is initiated by actuation of the adjusting device.

For adjusting an optical element, DE-OS No. 28 44 655 already proposes further, however, to provide on the rear frontal side of an adjusting ring, which serves as the mount, a curve representing the path of displacement of the optical element, against which positively rests a follower pin which is fastened to the mount of the optical element to be adjusted.

These known devices, in which adjustment paths having courses of movement which are interdependent but different from one another require a high outlay for accurate production of the grooves, for assembly and for alignment. They are furthermore sensitive to shock or vibrations, which has a negative effect on the alignment and fitting of the control pairing (pin/slot or curve/slot).

SUMMARY OF THE INVENTION

It is therefore an object of the invention to provide an improved adjusting device for lens systems.

It is a particular object of the invention to provide an adjusting device for lens systems which permits control of interdependent but differing courses of movement by means of guide elements fitted without clearance and which require a small outlay for their manufacture, mounting and alignment.

In accomplishing the foregoing objects, there has been provided according to the present invention an adjusting device for a lense system having at least two optical elements displaceable parallel to the optical axis, wherein the displacement paths of the optical elements are subject to interdependent but different courses of movement, comprising: a first optical element; a second optical element arranged along a common optical axis with the first optical element; a rotatable adjusting ring surrounding the optical elements and being movable parallel to the optical axis, for focussing the lens system; a tubular member positioned within the adjusting ring, the tubular member comprising near one end a mount for the first optical element and including near its opposite end a guide groove in its wall; a hollow cylindrical member displaceably mounted within the tubular member, this cylindrical member comprising a mount for the second optical element; a guide element mounted on the external surface of the cylindrical member for engagement with said guide groove; and means for drivingly connecting the adjusting ring with the cylindrical member.

Further objects, features and advantages of the present invention will become apparent from the detailed description of preferred embodiments which follows, when considered together with the attached figures of drawing.

BRIEF DESCRIPTION OF THE DRAWINGS

In the drawing, the invention is illustrated schematically with reference to an examplary embodiment. In the drawing.

DETAILED DESCRIPTION OF THE PREFERRED EMBODIMENTS

An adjusting device of the aforementioned type is provided for linear displacement of a lens parallel to the optical axis. In the rotatable adjusting ring which moves parallel to the optical axis in a conventional arrangement for focussing the lens, a tube is arranged which serves as the mount for one optical element and which has in the wall near one of its ends a guide groove, and a hollow cylinder serving as the mount for the other optical element is displaceably mounted in said tube. A guide element mounted on the external wall of the hollow cylinder engages the guide groove, and means to drivingly connect the adjusting ring and the hollow cylinder are provided.

Figure 1:
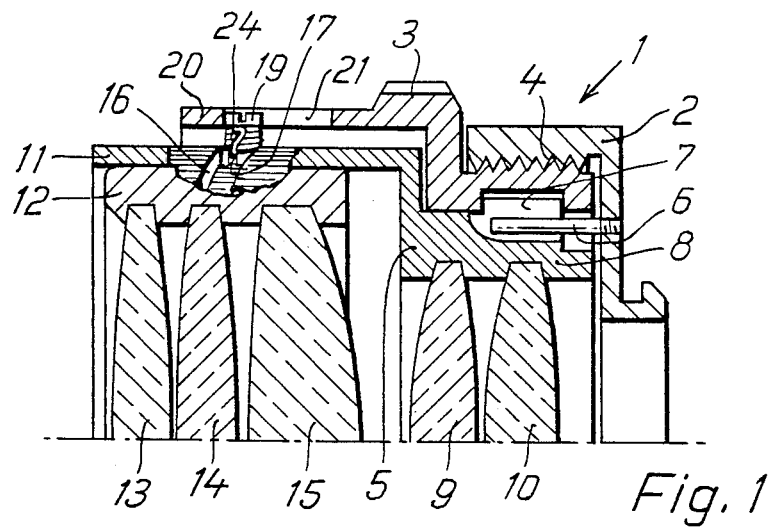
FIG. 1 is a cross-sectional view, partly broken away of a lens system.

Turning now to the drawings, FIG. 1 shows schematically a device 1 known to those skilled in the art as a "helical lens mount" for focusing the lens. It consists in the present case of a lens bayonet 2 attachable to a camera and an adjusting ring 3, both of which are interconnected by means of a transport thread 4.

A stepped tube 5 is supported in the adjusting ring 3 about which the adjusting ring rotates, but which defines a fixed relative position with the adjusting ring along the optical axis. The stepped tube 5 is guided in a straight line upon rotation of the adjusting ring 3 by a guide projection 6 integral with the bayonet 2. The projection engages a straight guide groove 7 on the tube 5.

In a rear section 8 of the tube 5, an optical element consisting of the lenses 9, 10 is mounted. In a front section 11 of the tube 5, on the other hand, a hollow cylinder 12 is supported, which is displaceable both in the radial and the axial direction. In cylinder 12 is mounted an optical element represented by the lenses 13, 14 and 15.

A guide groove 16 is machined into the wall of the front tube section 11. It is engaged by a guide element 17 which is mounted by means of a threaded bolt 18 on the outer wall of the hollow cylinder 12, with the shaft 19 of said bolt 18 projecting past the wall of the tube 5.

A tubular extension 20 of the adjusting ring 3 on the end opposite the transport thread 4 has a driver slot 21, which is engaged by the shaft 19 of the bolt 18, whereby a driving connection is established between the entire construction designated by reference numeral 1 and the hollow cylinder 12. The torsion spring 24 in FIG. 1 will be discussed infra with respect to FIGS. 2 and 3. The device described heretofore operates in the following manner:

Upon the actuation of the adjusting ring 3 to focus the lens system, the tube 5—and thus both optical elements—is displaced forwardly or rearwardly. Simultaneously, the optical element consisting of the lenses 13, 14, 15 executes an additional radial and axial movement, because the guide element 17 mounted on the outer wall of the hollow cylinder 12 is entrained by the adjusting ring 3, and the hollow cylinder 12 is forced into an axial movement by the sliding of the guide element 17 in the guide groove 16.

Figure 2:
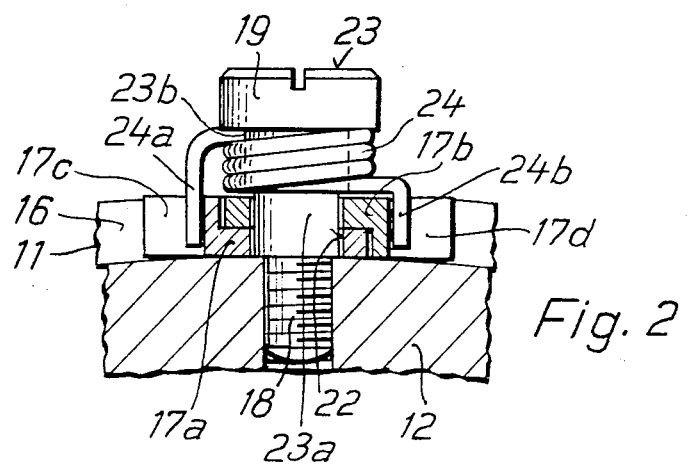
FIG. 2 is a lateral cross-sectional view of a guide element.
Figure 3:
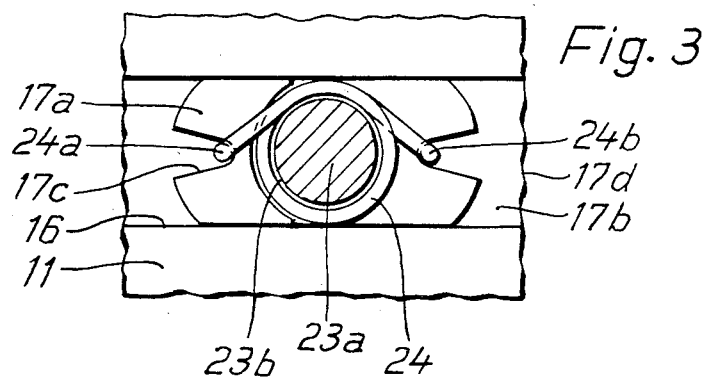
FIG. 3 is a top view of the guide element according to the invention.

FIGS. 2 and 3 illustrate an advantageous embodiment of the guide element 17. It comprises two mating adapter pieces 17a, 17b overlapping in their center parts and each provided with an axial bore 22. The connection of the two adapter pieces 17a, 17b, which are rotatable with respect to each other, is established by an axle 23 in the form of a double shoulder screw, which is screwed with its smaller shoulder 23a into the hollow cylinder 12, while passing through the axial bore 22.

A torsion spring 24 located around the larger shoulder 23b and engaging with its bent ends 24a and 24b in the V-shaped recesses 17c and 17d, respectively, clamps the adapter pieces 17a, 17b against each other and assures the proper seating of the guide element 17 in the guide groove 16.

What is claimed is:

1. An adjusting device for a lens system having at least two optical elements displaceable parallel to the optical axis, wherein the displacement paths of the optical elements are subject to interdependent but different courses of movement, comprising:
   a first optical element;
   a second optical element arranged along a common optical axis with said first optical element;
   a rotatable adjusting ring surrounding said optical elements and being movable parallel to said optical axis, for focusing the lens system, wherein rotation of said adjusting ring displaces the ring along said optical axis;
   a tubular member positioned within said adjusting ring, said tubular member comprising near one end a mount for said first optical element and including near its opposite end a guide groove in its wall, wherein said adjusting ring is rotatable with respect to the tubular member, wherein the adjusting ring and the tubular member define a fixed relative position along the optical axis, and wherein the tubular member is displaced only axially;
   a hollow cylindrical member displaceably mounted within said tubular member, said cylindrical member comprising a mount for said second optical element;
   a guide element mounted on the external surface of said cylindrical member for engagement with said guide groove and for guiding the cylindrical member in both an axial and a radial displacement; and
   means for drivingly connecting said adjusting ring with said cylindrical member.

2. An adjusting device according to claim 1, wherein the guide element comprises plural parts pivoting around a common axle.

3. An adjusting device according to claim 2, wherein the parts of the guide element are clamped against each other by a spring.

4. An adjusting device according to claim 1, wherein said connecting means comprises a slot in said adjusting ring and a portion of said guide element which engages said slot.

5. An adjusting device for a lens system having at least two optical elements displaceable parallel to the optical axis, wherein the displacement paths of the optical elements are subject to interdependent but different courses of movement, comprising:
   a first optical element;
   a second optical element arranged along a common optical axis with said first optical element;
   a rotatable adjusting ring surrounding said optical elements and being movable parallel to said optical axis, for focusing the lens system;
   a tubular member positioned within said adjusting ring, said tubular member comprising near one end a mount for said first optical element and including near its opposite end a guide groove in its wall, wherein said adjusting ring is rotatable with respect to the tubular member wherein the adjusting ring and the tubular member define a fixed relative position along the optical axis, and wherein the tubular member is displaced only axially;
   a hollow cylindrical member displaceably mounted within said tubular member, said cylindrical member comprising a mount for said second optical element;
   a guide element mounted on the external surface of said cylindrical member for engagement with said guide groove, wherein the guide element comprises plural parts pivoting around a common axle;
   means for drivingly connecting said adjusting ring with said cylindrical member.

6. An adjusting device according to claim 5, wherein the parts of the guide element are clamped against each other by a spring.

* * * * *